(12) United States Patent
Chilamakuri et al.

(10) Patent No.: US 11,539,534 B2
(45) Date of Patent: Dec. 27, 2022

(54) CREDENTIAL MAPPING FOR ANALYTICS PLATFORM

(71) Applicant: SAP SE, Walldorf (DE)

(72) Inventors: Sateesh Babu Chilamakuri, Tirupati (IN); Loic de l'Eprevier, Gennevilliers (FR)

(73) Assignee: SAP SE, Walldorf (DE)

( * ) Notice: Subject to any disclaimer, the term of this patent is extended or adjusted under 35 U.S.C. 154(b) by 288 days.

(21) Appl. No.: 16/998,777

(22) Filed: Aug. 20, 2020

(65) Prior Publication Data

US 2021/0391999 A1 Dec. 16, 2021

(30) Foreign Application Priority Data

Jun. 10, 2020 (IN) .............................. 202011024420

(51) Int. Cl.
| | | |
|---|---|---|
| *H04L 9/32* | (2006.01) | |
| *G06F 16/28* | (2019.01) | |
| *G06F 16/901* | (2019.01) | |
| *G06F 16/9035* | (2019.01) | |
| *G06F 21/60* | (2013.01) | |
| *G06F 21/62* | (2013.01) | |
| *H04L 67/306* | (2022.01) | |
| *G06F 21/41* | (2013.01) | |
| *H04L 9/08* | (2006.01) | |

(52) U.S. Cl.
CPC .......... *H04L 9/3263* (2013.01); *G06F 16/284* (2019.01); *G06F 16/9024* (2019.01); *G06F 16/9035* (2019.01); *G06F 21/604* (2013.01); *G06F 21/6218* (2013.01); *H04L 9/3226* (2013.01); *H04L 67/306* (2013.01)

(58) Field of Classification Search
CPC ... H04L 9/3263; H04L 9/3226; H04L 67/306; H04L 9/0891; G06F 16/284; G06F 16/9024; G06F 16/9035; G06F 21/604; G06F 21/6218; G06F 21/41
See application file for complete search history.

(56) References Cited

U.S. PATENT DOCUMENTS

| | | | | |
|---|---|---|---|---|
| 10,855,688 | B2* | 12/2020 | Sharabi | H04L 63/105 |
| 10,972,444 | B1* | 4/2021 | Schiesser | H04L 63/10 |
| 2016/0217169 | A1* | 7/2016 | Elias | G06F 21/6227 |
| 2017/0339148 | A1* | 11/2017 | Syomichev | G06F 21/00 |
| 2020/0401677 | A1* | 12/2020 | Childress | G06F 21/44 |

OTHER PUBLICATIONS

SAP, "Business Intelligence Platform Administrator Guide" (downloaded May 30, 2020), 1008 pages.

* cited by examiner

*Primary Examiner* — Darren B Schwartz
(74) *Attorney, Agent, or Firm* — Klarquist Sparkman, LLP

(57) ABSTRACT

An analytics platform or another system is provided to store multiple sets of credentials and other connection information in each user profile and to map the stored credentials to different resources within the platform. Each set of credentials can be associated with a credential mapping key, and each resource in the platform can be mapped to the credentials using a connection associating the resource with the credential mapping key. By mapping multiple sets of credentials and other connection information to the resources within the platform, the user profile can be transparently authenticated when accessing resources in the platform, different credentials can be used to authenticate the user profile with accessing different resources, and administrators can benefit by having greater control over permissions with the platform.

20 Claims, 12 Drawing Sheets

CREDENTIAL MAPPING FOR ANALYTICS PLATFORM

PRIORITY CLAIM

This application claims priority to Indian Provisional Patent Application No. 202011024420, filed Jun. 10, 2020, which is incorporated by reference herein.

FIELD

The field generally relates to connecting user credentials with data sources in an analytics platform.

BACKGROUND

Analytics platforms often publish documents with data linked from one or more data sources, such as different database files. Users can log into the analytics platform to access the published documents via a user profile. To access or refresh the document to update data from the data source(s), the user profile will be authenticated by the platform to determine if the user has permission to refresh the database information. A single user credential (e.g., a username and password) is stored in the user profile for the authentication. However, the same user credential must be used in authenticating the user profile in all databases of the analytics platform, in a one-to-one credential mapping, or the user must manually enter a different credential during authentication.

There thus remains a need for an analytics platform with a one-to-many credential mapping allowing for different credentials to be attached to a user profile for authenticating the user for different data sources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method is provided. The computer-implemented method includes configuring a first credential mapping key object for a first data file and configuring a second credential mapping key object for a second data file. The method also includes configuring a first user object associated with a user account and configuring a second user object associated with the user account. The first user object includes a first set of unique user credentials associated with the first credential mapping key object and the second user object includes a second set of unique user credentials associated with the second credential mapping key object. The method further includes configuring a first connection object associating the first credential mapping key object with the first data file and configuring a second connection object associating the second credential mapping key object with the second data file. The method also includes refreshing a published document in the user account. The published document includes data from the first and second data files, and refreshing the published document includes updating the data from the first and second data files. Updating the data from the first data file can include accessing the first data file with the first set of unique user credentials from the first user object based on the first connection, and updating the data from the second data file can include accessing the second data file with the second set of unique user credentials from the second user object based on the second connection.

In another embodiment, a computing system includes one or more processors and memory configured to cause the one or more processors to perform operations. The operations include adding a first credential mapping key and a second credential mapping key. The operations also include configuring a profile with a first set of unique user credentials associated with the first credential mapping key and configuring the profile with a second set of unique user credentials associated with the second credential mapping key. The operations further include configuring a first connection associating the first credential mapping key with a first data file and configuring a second connection associating the second credential mapping key with a second data file. The operations also include refreshing a published document based on an input associated with the profile. The published document includes data from the first and second data files, and the refreshing the published document can include updating the data from the first and second data files based on the first and second connections.

In yet another embodiment, one or more non-transitory computer-readable media is provided with computer-executable instructions that, when executed, cause a computing system to perform a method. The method includes publishing a document in an analytics platform with data from a first data file and a second data file. The data is linked to the document from the first and second data files. The method also includes receiving a first credential mapping key configuration for identifying a first set of credentials and a second credential mapping key configuration for identifying a second set of credentials by the analytics platform. The method likewise includes receiving the first set of credentials associated with the first credential mapping key and the second set of credentials associated with the second credential mapping key for a profile of the analytics platform. The method further includes receiving a first connection associating the first credential mapping key with the first data file and a second connection associating the second credential mapping key with the second data file by the analytics platform and accessing the published document via the profile. Accessing the published document can include fetching data from the first and second data files based on the first and second connections.

The foregoing and other objects, features, and advantages of the invention will become more apparent from the following detailed description, which proceeds with reference to the accompanying figures.

DETAILED DESCRIPTION

Example 1—Overview

Figure 1:
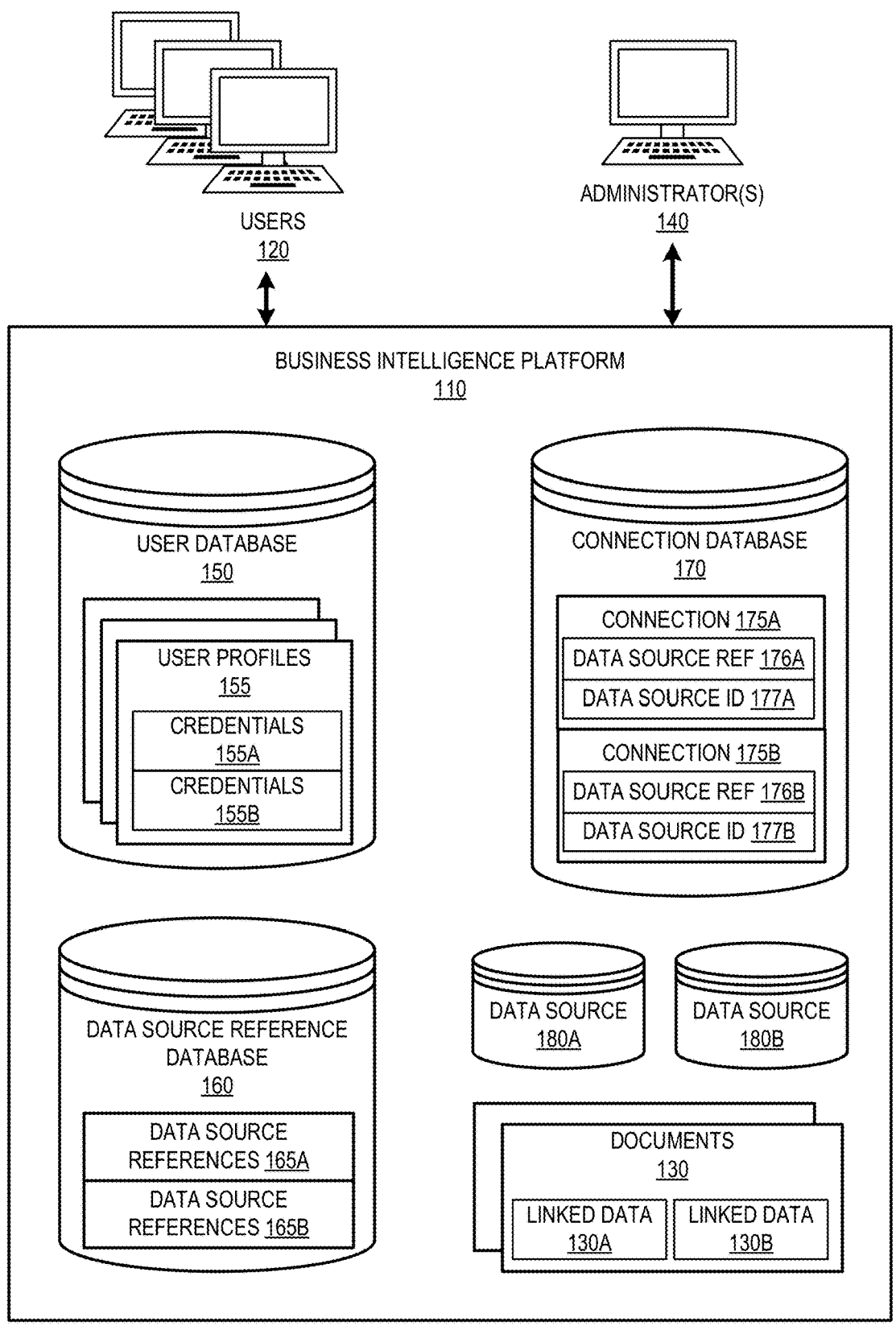
FIG. 1 is a block diagram of an example overall system for credential mapping in an analytics platform.

Authenticating user profiles (e.g., user accounts) and granting access to data sources (e.g., files and resources, such as databases), documents (e.g., reports), and other resources is an important feature in analytics platforms and other systems. In some systems, user profiles cannot store more than one set of heterogeneous connection information (e.g., credentials, such as username and password) for authenticating the user profile in the system. Because the same user can have a profile configured for accessing different databases of different organizations, users can benefit from using more than one set of connection information (e.g., with complete connection information sufficient to access all permissible platform resources) were stored within the user's profile. This way, the user can store multiple connection information instances (e.g., credentials, such as username and password) for different platform resources and use the instances when accessing the different resources.

Embodiments provide for an analytics platform or another system to store multiple sets of credentials and other connection information in each user profile and mapping the credentials to different resources within the platform. By mapping multiple sets of credentials and other connection information to the resources within the platform, the user profile can be transparently authenticated when accessing resources in the platform, different credentials can be used to authenticate the user profile with accessing different resources, and administrators can benefit by having greater control over permissions within the platform, such as by providing for additional administrative use cases, such as better control over access to each resource within the platform. Further, because an administrator can set up multiple credentials in the user profiles at one time, the connection information can subsequently be retrieved on a needed basis from the user-specific information, providing added security through use of the multiple credential sets.

For example, in an analytics platform environment, a simple single sign-on approach may not be sufficient for all administrative use cases, such as when a user profile may need a plurality of credentials to access a single resource (e.g., both connection credentials and data source credentials). The technologies described herein can provide a powerful set of credential mapping functionalities that avoid problems associated with credentials in an analytics platform environment and can do so transparently to the user accessing the platform resources. A complex matrix of rights embodied in user credentials can be implemented while avoiding complexity at the user interface level. Further, the technologies can benefit users who serve roles an administrator and/or are delegated administrators by eliminating the need for such users to juggle or manage a large number of credential sets to access different resources while serving different roles within the platform.

Example 2—Example System for Credential Mapping

FIG. 1 is a block diagram of an example system for credential mapping for a business intelligence (BI) platform or another analytics platform. In the example, the system 100 can include a business intelligence platform 110, one or more users 120, and one or more administrators 140. The business intelligence platform 110 can store multiple credentials 155A, 155B for each user profile 155 and can map the credentials 155A, 155B to different data sources 180A, 180B allowing the user profile to transparently access the data sources 180A, 180B while logged into the business intelligence platform 110, as described herein.

In some examples, the business intelligence platform 110 can be provided as a multi-tenant platform with multiple tenants. In the multi-tenant example, each tenant will have a different set of users 120 and administrator(s) 140. Each tenant can be a different customer of the business intelligence platform 110, such as different organizations, corporations, businesses, or other entities. The business intelligence platform 110 can be hosted on a cloud platform, accessible by the different tenants over a network.

In the example shown, multiple users 120 and an administrator 140 from a single tenant are depicted. For example, the users 120 and the administrator 140 can be employees of the same business customer of the business intelligence platform 110. The administrator 140 can log into the business intelligence platform 110 to configure user profiles 155 in a user database 150 and permissions for accessing data sources 180A, 180B.

The administrator 140 can add data source references 165A, 165B (e.g., as credential mapping keys) to the data source reference database 160 in the business intelligence platform 110. The data source references 165A, 165B can be used for mapping credentials to data sources 180A, 180B. Although the example depicted in FIG. 1 shows two data sources 180A, 180B, additional or fewer data sources can be used. The data source references are configured as unique identifiers within the business intelligence platform 110. For example, the data source references 165A, 165B can include a title and a description. Additional and different information can be included in the data source references 165A, 165B, such as a unique identification number.

The administrator 140 can also configure user profiles 155 (e.g., user accounts) in the user database 150 in the business intelligence platform 110. Each user profile 155 corresponds to a different user 120. For example, in a user profile 155, the administrator 140 adds credentials 155A, 155B, such as username/password sets. Other types of credentials can be used, such as digital tokens, digital tickets, and other credential types.

The credentials 155A, 155B can be mapped to the data sources 180A, 180B using the data source references 165A, 165B and connections 175A, 175B. For example, credential 155A and credential 155B are associated with data source reference 165A and data source reference 165B, respectively. The credentials 155A, 155B can be associated with the data source references 165A, 165B by selecting a data source reference for each credential from a drop down menu or via another interface, such as by selecting a data source reference identified by a title, description, identification number, or another identifier.

The administrator 140 can likewise add connections 175A, 175B in the connection database 170 in the business intelligence platform 110. The connections 175A, 175B can be configured to associate the data source references 165A, 165B with the data sources 180A, 180B. For example, connection 175A is configured with a data source reference ID 176A referencing data source reference 165A and a data source ID 177A referencing data source 180A. Connection 175B is likewise configured with a data source reference ID 176B referencing data source reference 165B and a data source ID 177B referencing data source 180B. The connections 175A, 175B complete the mapping of credentials 155A, 155B to the data sources 180A, 180B.

By mapping credentials to data sources, the administrator 140 can enable additional administrative use cases within the business intelligence platform 110 and provide control over accessing each data source 180A, 180B within the business intelligence platform 110. For example, the administrator 140 can map credentials from multiple user profiles 155 to the data sources 180A, 180B using the same data source references 165A, 165B and connections 175A, 175B, granting the multiple user profiles 155 permission to access and/or modify the data sources 180A, 180B.

Further, the administrator 140 can map different credentials from the same user profile 155 to the data sources 180A, 180B using different data source references and connections, granting the same user profiles 155 different permissions the same data sources 180A, 180B, such as with read-only access, with read-write access, with temporary administrative rights, and/or with other permissions to access and/or modify the data sources 180A, 180B.

The users 120 can log into user profile 155 in the business intelligence platform 110 to access the data sources 180A, 180B, to access documents 130, and to perform other functions. In an example, a user 120 logs into the business intelligence platform 110 and opens document 130. The document 130 includes linked data 130A, 130B from data sources 180A, 180B. To view or update the linked data 130A, 130B, the business intelligence platform 110 authenticates the user profile 155 via the mapped credentials 155A, 155B via connections 175A, 175B and data source references 165A, 165B.

In this example, data sources 180A, 180B are different types of databases with linked data 130A, 130B in document 130 (e.g., a report). Different database file types can include Oracle, Teradata, Microsoft SQL, IBM, and other database types. The different database types can use different architectures and configurations, such as relational, sequence, graphic, centralized, distributed, operational, NoSQL, object-oriented, file-oriented, and other database types. Other data sources and files can also be mapped to credentials, such as documents 130, server locations, file folders, electronic files, including spreadsheets, text files, Extensible Markup Language (XML) files, JavaScript Object Notation (JSON) files, and word processing files, software applications, and other resource types.

Example 3—Example Method of Credential Mapping

Figure 2:
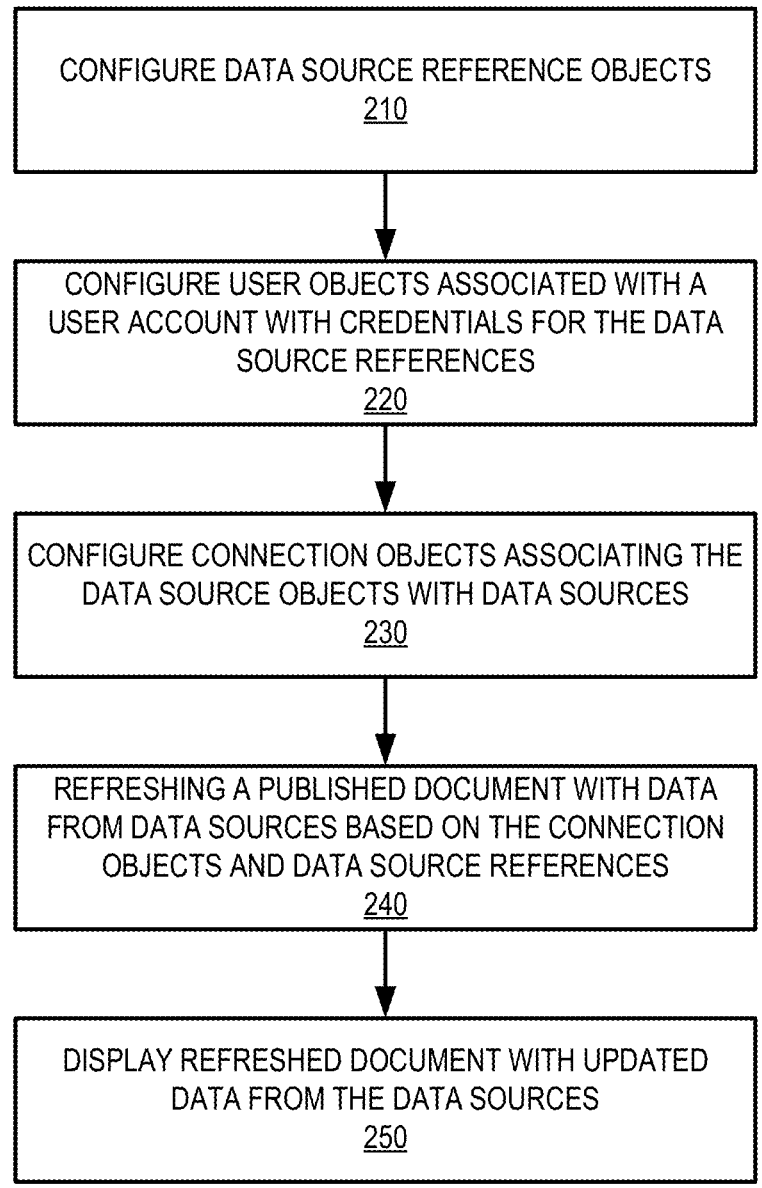
FIG. 2 is a flowchart of an example overall method of credential mapping in an analytics platform.

FIG. 2 is a flowchart of an example overall method of credential mapping for a business intelligence (BI) platform or another analytics platform, for example, by the system of FIG. 1 (e.g., the business intelligence platform 110). The automated nature of the method 200 allows a user 120 to view documents 130 with linked data 130A, 130B and to access data sources 180A, 180B and other resources by transparently authenticating the user profile 155 in the business intelligence platform 110.

At 210, credential mapping keys, such as data source reference objects, are configured. The data source reference objects can be configured by an administrator or another user. For example, a first data source reference object can be configured for a first data source, such as a first data file, and a second data source reference object can be configured for a second data source, such as a second data file. In some embodiments, the first and second data sources are different databases, such as of different database types (e.g., an Oracle database and a Teradata database). Additional and fewer data source reference objects may be configured, such as a third data source reference object for a third data source, or only one data source reference object for a single data source.

At 220, user objects are configured. The user objects can be configured by an administrator or another user. The user objects can be associated with a user profile (e.g., a user account) and configured with credentials for the data source references. For example, a first user object is configured in a user account with a first set of unique user credentials associated with the first data source reference object. A second user object is configured in the same user account with a second set of unique user credentials associated with the second data source reference object.

The first set of unique user credentials can be associated with the first data source reference object by a first unique identifier, title, and/or description, and the second set of unique user credentials is associated with the second data source reference object by a second unique identifier, title, and/or description. For example, the first set of unique user credentials can include a first username and a first password, such as for a first database, and the second set of unique user credentials can include a second username and a second password, such as for a second database of the same or of a different database type. Additional, fewer, and different user objects may be configured, such as a third user object for a third data source reference, or only one user object associated with a single data source reference.

At 230, connection objects are configured. The connection objects can be configured by an administrator or another user. For example, a first connection object can be configured associating the first data source reference object with the first data source and a second connection object can be configured associating the second data source reference object with the second data source. In some embodiments, configuring the first and second connection objects includes first enabling data source reference authentication for the first and second connection objects. In some embodiments, configuring the first connection object includes selecting a first data source type for the first connection object and configuring the second connection object includes selecting a second data source type for the second connection object.

At 240, a published document is refreshed by a user associated with the user account. For example, the published document includes data from the first and second data sources, which is updated from the first and second data sources by refreshing the document. In some embodiments, refreshing the published document can include retrieving data from other servers or computing devices over a network. Updating the data from the first data source accesses the first data source with the first set of unique user credentials from the first user object based on the first connection, and updating the data from the second data source accesses the second data source with the second set of unique user credentials from the second user object based on the second connection. At 250, the refreshed document is displayed the user with the updated data from the data sources.

Additional and different acts can be performed. For example, in some embodiments, a user group object is configured. The user group object can be configured by an administrator or another user. The user group object can be associated with a multiple user accounts making up a group. The user group object is configured with unique user credentials associated with a data source reference object. A connection object can associate the data source reference object with a data source. The published document can be refreshed by any of the users in the user group using credentials stored in the user group object and mapped to the data source using the data source reference and connection for the group object.

Example 4—Example Class Administration Diagram

Figure 3:
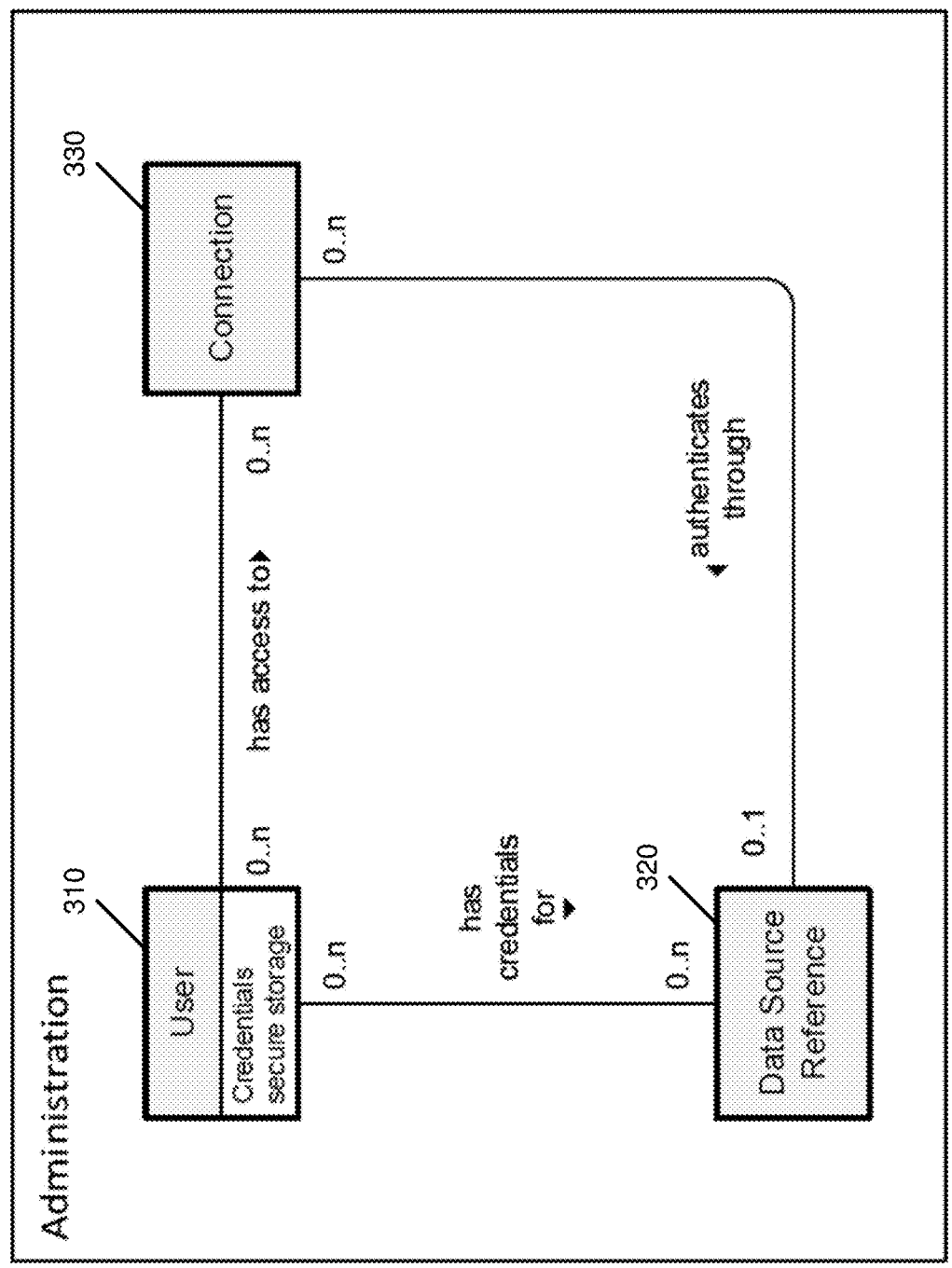
FIG. 3 is a class diagram for object administration in an analytics platform.

FIG. 3 is class diagram for object administration in an analytics platform. For example, an administrator can configure a user object 310, a data source reference object 320, and a connection object 330 in the analytics platform. For example, by configuring the objects, the administrator adds the objects to one or more databases of objects in the analytics platform. The user object 310 is configured to securely store a credential set associate with a user profile. The user profile is granted access to a data source by configuring a connection object 330, which authenticates the user profile by fetching the credential set through the data source reference object 320. Each object set containing a user object 310, a data source reference object 320, and a connection object 330 maps a different credential set to a data source in the analytics platform.

Example 5—Example Class Consumption Diagram

Figure 4:
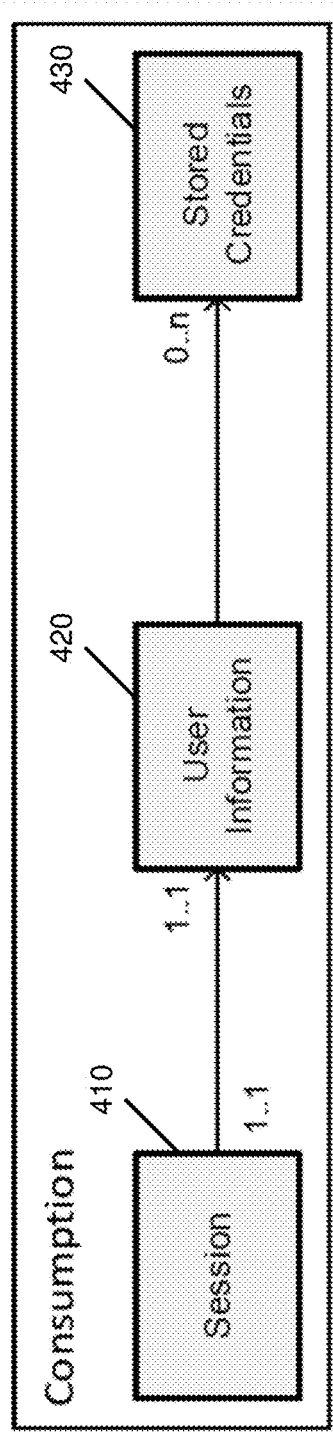
FIG. 4 is a class diagram for object consumption in an analytics platform.

FIG. 4 is a class diagram for object consumption in an analytics platform. For example, a user can consume the user object 310, a data source reference object 320, and a connection object 330 discussed in FIG. 3. The user can initiate a session 410 by logging into a user profile in the analytics platform with user information 420. The user can access a document or data source with the stored credentials 430 associated with the user profile. The objects discussed in FIG. 3 map the stored credentials 430 based on the user information 420.

Example 6—Solution Overview

Credential mapping in an analytics platform can be implemented using credential mapping keys. Credential mapping keys can take the form of data source references or data references, as described herein. Current analytics platforms only include a one-to-one mapping for credentials (e.g., a username and password) attached to user profile. For example, the user profile and attached credentials can be maintained in a central management console (CMC), as depicted in FIGS. 5-8. The disclosed embodiments provide for the CMC to store multiple credential sets (e.g., pairs of usernames and passwords) for each user, providing for a one-to-many mapping for the credential sets.

The CMC can be configured by an administrator or another user to enable credential mapping in the analytics platform. For example, to enable the credential mapping functionality, an administrator can add another item, such as an object, inside the CMC configuration enabling the credential mapping (e.g., CMC Home>Define Theme>"Credential Mapping Keys"). For example, when a user clicks on the "Credential Mapping Keys" item in an interface, the user can maintain multiple credential mapping keys with descriptions. In this example, by default, there can be one key with a default key name (e.g., "default.key") and a description stating that the default key is provided for supporting legacy one-to-one credential mapping scenarios.

In addition to or in alternative to the default key name, additional exemplary credential mapping keys can also be maintained as follows:

| Key Name | Description |
| --- | --- |
| default.key | Supporting legacy credential |
| org.oracle.crm.production | Organization's CRM's Production database |
| org.sqlserver.hr.db | Organization's HR database |
| (Users can maintain any key here) | (Users can maintain any description here) |

In some embodiments, the credential mapping key name maintained in the CMC cannot be modified, but the description can be updated. Credential mapping keys can be deactivated, such as to disable a key from being listed in user profiles and to disable any further maintenance of the disabled keys. In some embodiments, the keys can be deleted and/or archived.

After the credential mapping keys are defined in the CMC, credential mapping can be performed associating a user profile with data sources, such as databases in the analytics platform. For credential mapping in a user profile, user properties can be enhanced to include values for relevant credential sets (e.g., pairs of usernames and passwords). For example, "default.key" would take the values of an existing username and password pair. Additional username and password pairs can be maintained against the other active (e.g., not deleted or archived) credential mapping keys.

For example, a user "John" is from customer relationship management (CRM) team and an administrator configures John's user profile to maintain a username and password against the "org.oracle.crm.production" key. To map the key to a data source, the administrator also creates a connection (e.g., to a database) by choosing credential mapping in the connection (e.g., "Use Business Objects Credential Mapping") and defining which key is to be used for the connection to the data source. The default key value is "default-.key" to ensure that existing customer scenarios continue to work (e.g., providing backward compatibility). In defining which key is to be used for the connection, a drop-down menu or another interface can show the active credential mapping keys that are available for the connection. The administrator can select a key from the list to map the key to the data source.

When John accesses the data source, the connection will be used to authenticate John's user profile. When the connection is used, a connection server can retrieve the selected key from the semantic layer. The key and the John's ID/CUID can be used to quickly retrieve that John's name and password attached to the key to authenticate John's user profile, permitting access to the data source without being aware (i.e., transparently) of the authentication process.

Example 7—Example Objects Explorer

The technologies can be incorporated into a logical data objects explorer (or simply "objects explorer") or other tools of an analytics platform environment.

In any of the examples herein, an objects explorer can comprise a data discovery and visualization tool that provides pre-defined datasets (e.g., information spaces) and associated exploration view sets to allow users to explore, visualize, and analyze data sets. Power users can be made creators with the ability to create and modify information spaces. Users that are explorers can consume the information spaces. Drill down through data sets can be rapid with filters excluding information that is not relevant to the topic being analyzed. The data and information can be presented in various graphical forms as appropriate to a given audience. An objects explorer can be used on its own or as a component of a business intelligence platform.

Example 8—Example Analytics Platform Environment

The technologies can be incorporated into an Analytics Platform Environment, such as the SAP BusinessObjects BI suite engineered by SAP SE of Walldorf, Germany, or other similar systems. Such environments can support a wide variety of credential types across different resources, including reports, database access, query management, scheduling, and the like.

Such environments typically include a suite of applications and can support features such as real-time BI access, flexibility, scalability, and decision-making support. Cloud support can enable cloud analytics that can process on-premise data, including live data in a hybrid analytics scenario.

Although an analytics platform environment can be engineered to be simple at the user interface level, the actual inner workings can be quite complex. For example, the credentials to establish a connection to a system can be different from those that provide rights to the underlying data sources of the system (e.g., managed by an access control list or the like).

As an example, a user may connect to a database system using connection credentials, but then need different credentials to access or create a report. To add to the complexity, in other cases, there may be overlap (e.g., the same connection credentials are re-used to access a second data source, but a different username is used for the second data source). Many other scenarios are possible.

Example 9—Example Logical Data Objects

In any of the examples herein, a logical data object can take the form of a programming object that encapsulates properties (e.g., attribute/value pairs) and methods (e.g., logic or rules that can access an underlying database) and can include other features. In practice, the logical data object can represent real-world entities such as suppliers, products, employees, stores, requests for information, or the like.

An instance of the logical data object class can be instantiated with particular properties, which can be persisted for use in calculations, database operations, and the like.

Example 10—Example Benefits

The credential mapping functionality can enhance existing functionality in an analytics platform and can help administrators and users leverage one-to-many credential mapping in different use case scenarios, such as by providing additional authentication options where the administrators and users are already using one-to-one credential mapping.

By mapping multiple sets of credentials to the resources within the platform, the user profile can be transparently authenticated when accessing resources in the platform, with the user being unaware that the user profile is being authenticated with the attached credentials from the user profile. Further, the administrator can assign different credentials to authenticate the user profile with accessing different resources, and administrators can benefit by having greater control over permissions and resource access within the platform.

Because an administrator can set up multiple credentials for in user profiles in a one-time activity, the connection information can subsequently be retrieved on a needed basis from the user-specific information, providing added security through the multiple credential sets. Further, user security can be assigned on the database instead of inside the explorer (e.g., Business Objects Explorer). Single sign-on can also work for scheduling and publishing scenarios, unlike the case with Kerberos.

The framework can also be extended to cloud applications, such as in a multi-tenant cloud platform, allowing users to access platform resources over a network.

Example 11—Example Further Description

In some analytics and business intelligence platforms (e.g., Business Intelligence 4.2.X and earlier releases), an administrator can only save one set of database credentials for a user in a central management console. Such functionality requires the administrator to maintain the same credentials for all databases in the platform. Enhanced credential mapping provides additional functionality that allows an administrator to save multiple sets of database credentials for each user through data source references, such as in enhanced versions of analytics and business intelligence platforms (e.g., BI 4.3 and later releases).

An administrator creates a credential mapping key, such as a data source reference, in a business intelligence (BI) platform or another analytics platform. The data source reference is then used in the user properties of a user profile where the administrator defines one set of the database credentials against it. This data source reference is then used as part of the enhanced credential mapping, which is a mode of authentication available in the connections. An administrator gets an option to select the data source reference of their choice when credential mapping is selected as the mode of authentication. In a similar way, an administrator can create multiple data source references for multiple databases connecting to the BI platform and to define unique credentials for each user.

In some embodiments, the administrator can import user profiles/objects through a CSV file, or via another bulk import file, and can promote users using a promotion management tool. When the administrator selects to synchronize data source credentials during logon for enterprise, lightweight directory access protocol (LDAP), and Windows active directory (AD) authentication types, the analytics or business intelligence platform assigns the database credentials to the default data source reference.

In an example of the enhance credential mapping, two data source references are added in a BI platform. DSR1 is a first data source reference for an organization's sales database and DSR2 is a second data source reference for an organization's finance database. Each data source reference will then have different database credentials defined in the user properties of a profile for a User. Two connections CN1 and CN2 are defined in the BI and are configured to use credential mapping as the mode of authentication. Then DSR1 is associated with the connection CN1 and similarly DSR2 is associated with CN2. When the User refreshes a report that requires access to the organization's sales database, the BI platform searches for the DSR1 in the user properties of the User's profile and consumes the database credentials defined against DSR1 to establish a connection to the organization's sales database. The User then can view the report.

Example 12—Example Workflow Sequence

FIGS. 5-8 are sequence diagrams for credential mapping in an analytics platform. The sequence diagrams include an administrator 510, a central management console 520 (CMC), a central management server 530, a business analyst 540, an analysis OLAP server 550, and a database 560. Additional and different servers and databases can be provided, such as additional databases mapped to different credentials in the central management server 530.

In a workflow sequence to use a data source reference, an administrator can complete the following tasks: 1. create a data source reference; 2. define database credentials against the data source reference for a user profile; and 3. associate the data source reference in an online analytical processing (OLAP) or relational connection.

Figure 5:
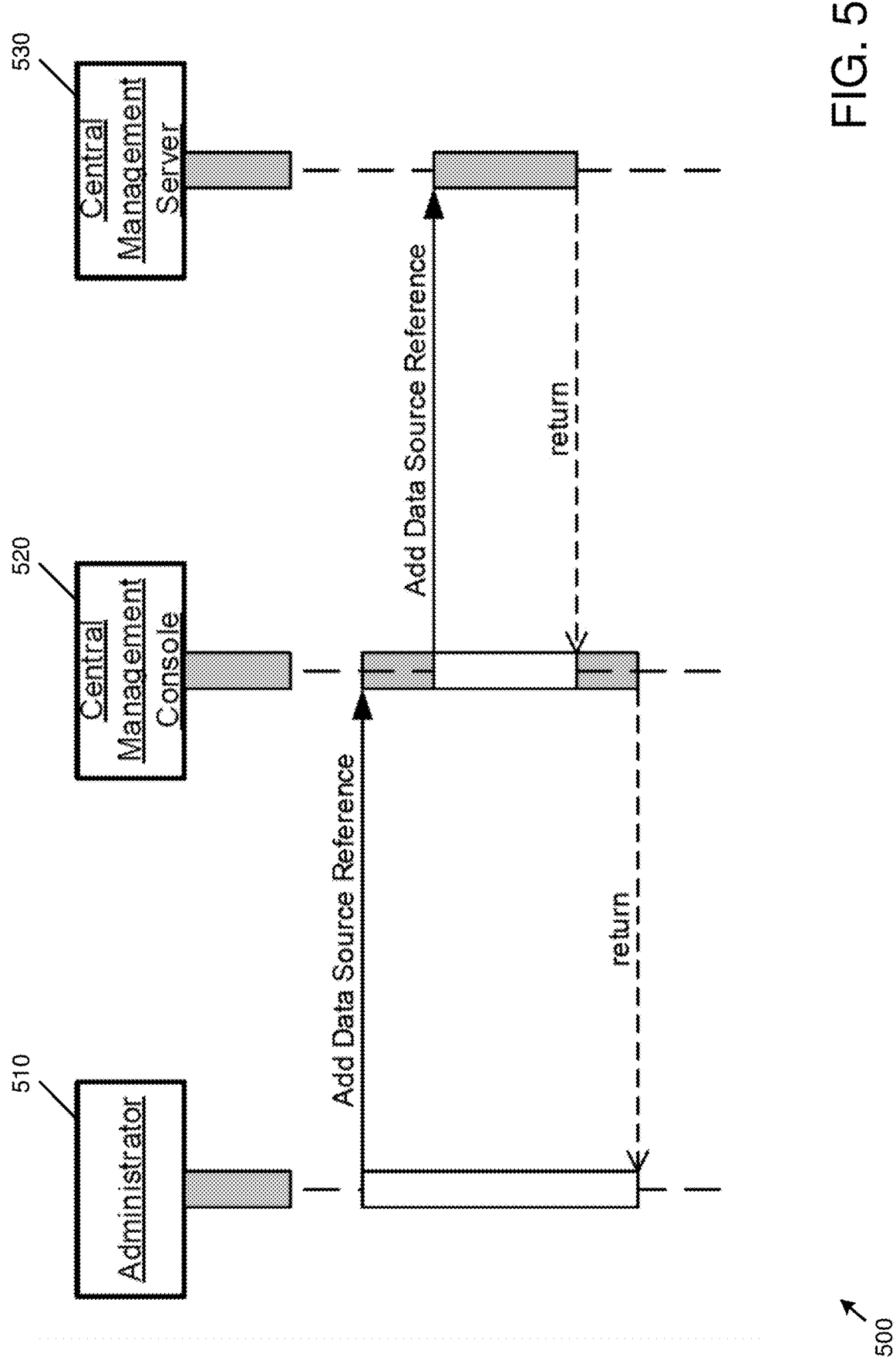
FIG. 5 is a sequence diagram for adding a data source reference.

FIG. 5 is a sequence diagram for adding a data source reference. A data source reference acts as a variable that an administrator 510 creates in the analytics or BI platform to save a unique set of database credentials for each user.

For example, to provide for enhanced credential mapping in the analytics platform, an administrator 510 adds a data source reference in the central management console 520. Next, the data source reference is added to the central management server 530 by the central management console 520. In this example, the central management server 530 stores the data source references as objects, and the central management console 520 provides an interface for the administrator 510 to map credentials in the analytics platform.

An exemplary procedure for adding the data source reference includes: 1. the administrator 510 logs into the central management console 520; 2. under define, the administrator selects to go to data source references; 3. the administrator 510 selects the icon to create new data source reference; 4. the administrator 510 adds a title and a description of the new data source reference; and 5. administrator 510 selects OK to save the new data source reference. The procedure can be repeated to add additional data source references.

Figure 6:
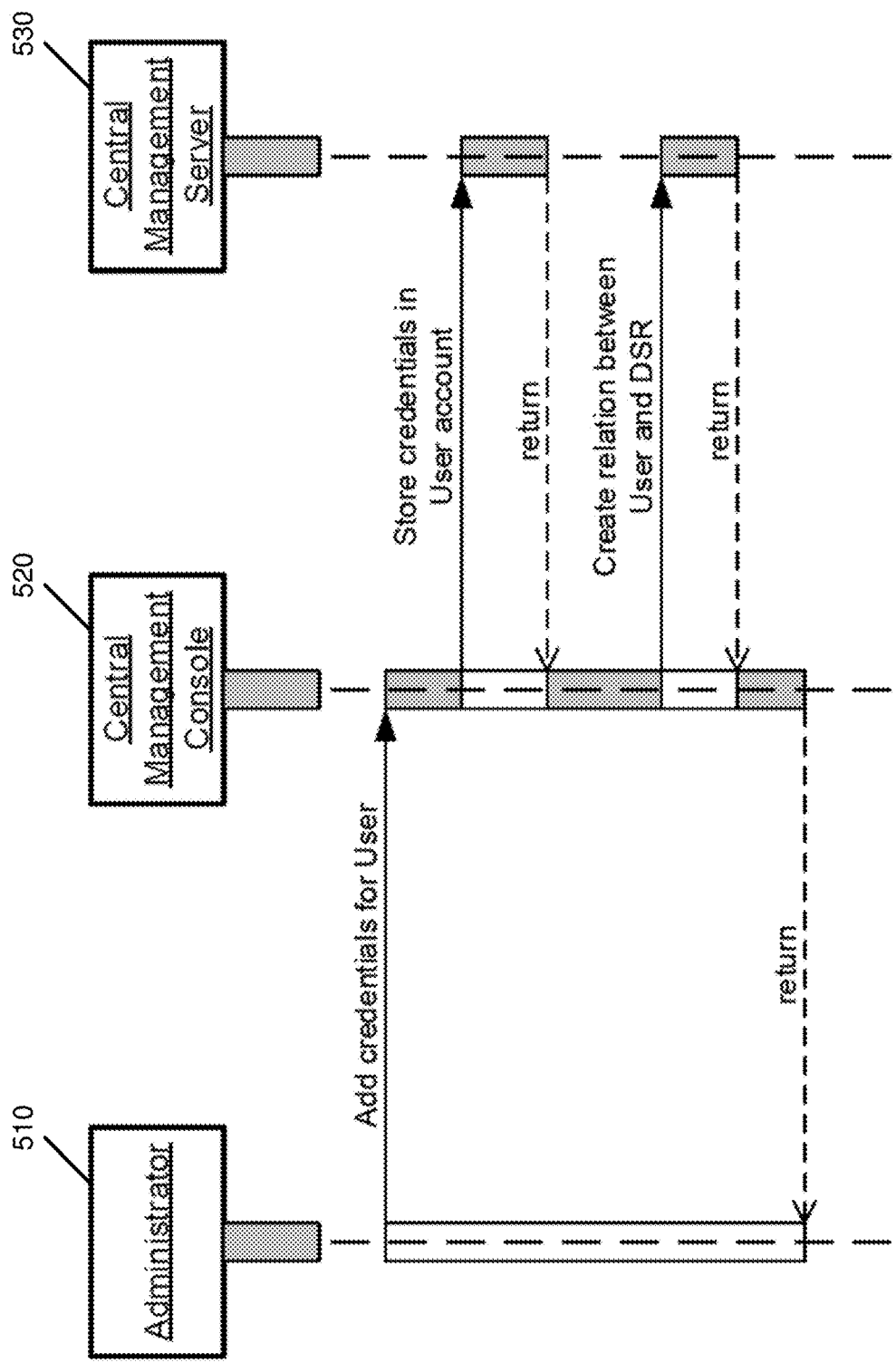
FIG. 6 is a sequence diagram for defining credentials against a data source reference.

FIG. 6 is a sequence diagram for defining credentials against a data source reference. A data source reference can have a data source (e.g., a database) credential defined in the user properties to allow the user to connect to the data source.

For example, to define credentials for enhanced credential mapping in the analytics platform, an administrator 510 adds credentials for a user to the central management console 520. Next, the central management server 530 stores the credentials in a user account. The central management console 520 also creates a relation between the user account and the data source reference in the central management server 530, such as in response to the administrator 510 selecting a data source reference in the central management console 520.

An exemplary procedure for defining credential against a data source reference includes: 1. the administrator 510 logs into central management console 520; 2. the administrator 510 selects users and groups; 3. the administrator 510 logs opens a context menu of a user account from a user list; 4. the administrator 510 selects properties and then selects add under data source credentials; 5. the administrator 510 then selects the preferred data source reference, such as from a list in a drop down menu; 6. the administrator 510 logs enters the values for account/user name, password, and confirms the password; 7. the administrator 510 can repeat the process from step 4 to add credentials to another data source reference; 8. the administrator 510 selects save & close.

In some embodiments, data source credentials can be defined against a data source reference for a group of users. For example, if a user from the group logs into the analytics or BI platform, the user can access a data source via the credentials for the group of users. In some embodiments, defining data source credentials against a data source reference for a group of users does not update the data source references for members of any sub-groups. In these embodiments, the process can be repeated for any sub-groups to update the data source references for sub-group members.

An exemplary procedure for defining credential against a data source reference for a group of users includes: 1. the administrator 510 logs into central management console 520; 2. the administrator 510 selects users and groups; 3. the administrator 510 selects a context menu of a user group and selects account manager; 4. the administrator 510 then selects a checkbox against database credentials and then select add; 5. the administrator 510 enters the values for the required fields; and 6. the administrator 510 selects save & close.

Figure 7:
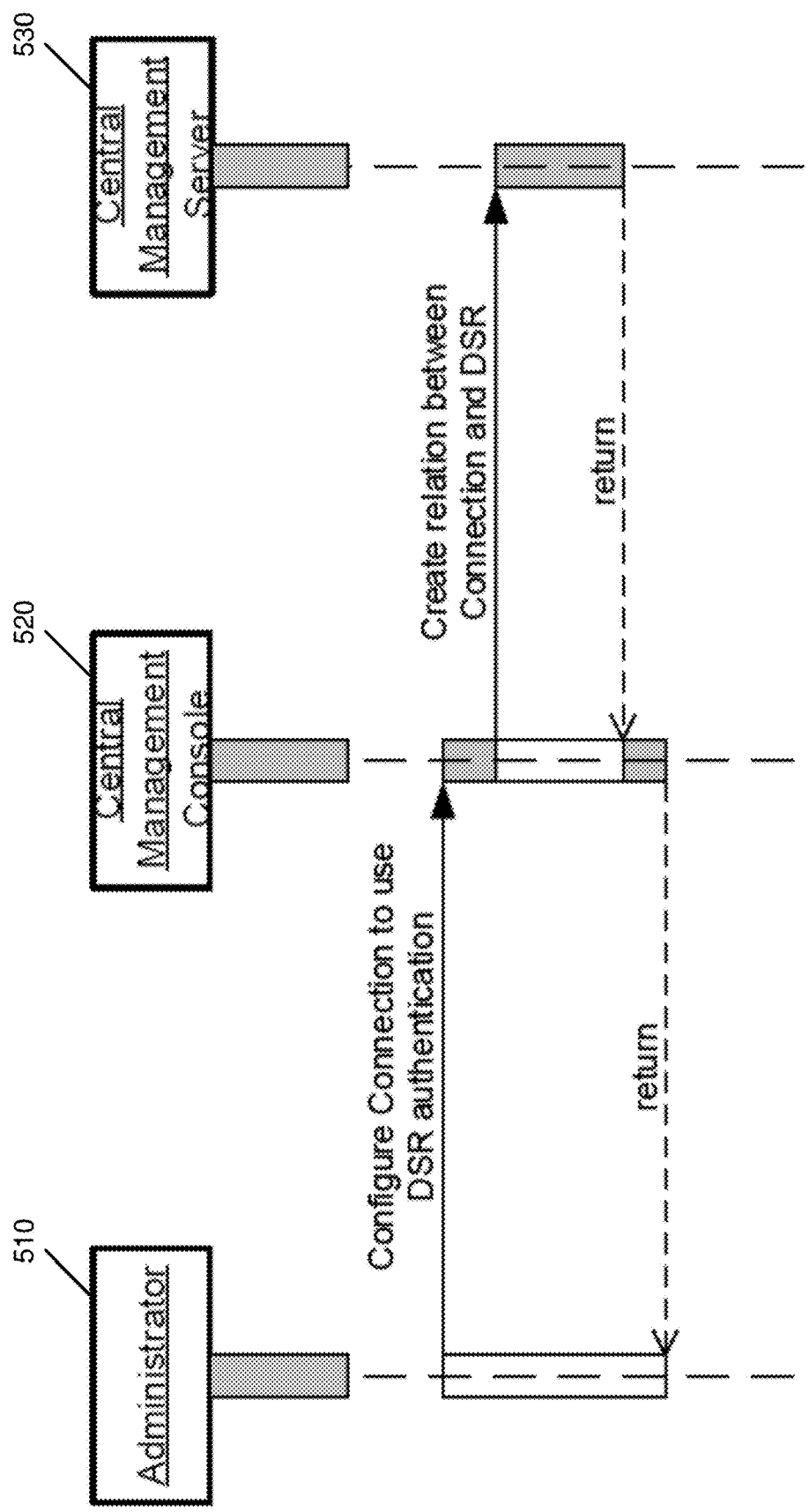
FIG. 7 is a sequence diagram for associating a data source reference with a connection.

FIG. 7 is a sequence diagram for associating a data source reference with a connection. For example, an administrator 510 can select the data source reference for a connection when credential mapping is selected as the mode of authentication for the connection.

To associate a data source reference in OLAP or another relational connection, the administrator 510 configures a connection in the central management console 520 to use data source reference authentication. In response to the configuration provided by the administrator 510, the central management console 520 creates a relation between the connection and the data source reference in the central management server 530.

An exemplary procedure for associating a data source reference with a connection includes: 1. the administrator 510 logs into central management console 520; 2. the administrator 510 selects OLAP Connections; 3. the administrator 510 opens an existing connection or creates a new connection; 4. in the authentication field, the administrator 510 selects credential mapping, and a data source reference field appears; 5. the administrator 510 selects a data source reference; and 6. the administrator 510 enters the required details and selects save. When creating or editing a relational/OLAP connection, the administrator 510 selects the credential mapping option for the authentication mode. If the connection (e.g., Data Source Reference) property is missing, default secondary credentials are used.

When a user connects to a database or another data source, the user creates a connection that uses a pair of username and password connection credentials. The connection server now supports multiple sets of connection credentials (e.g., the enhanced credential mapping). The user can enter the relevant credentials for a given connection in order to create or edit that connection, or to consume the connection. To use the multiple credential feature, at connection creation time, enhanced credential mapping can be used. To use the multiple credential feature, the user logs into a user profile and accesses a data source. The connection server authenticates the user profiles in the background using the data source reference and connection, allowing the user profile to be authenticated transparently to the user.

Figure 8:
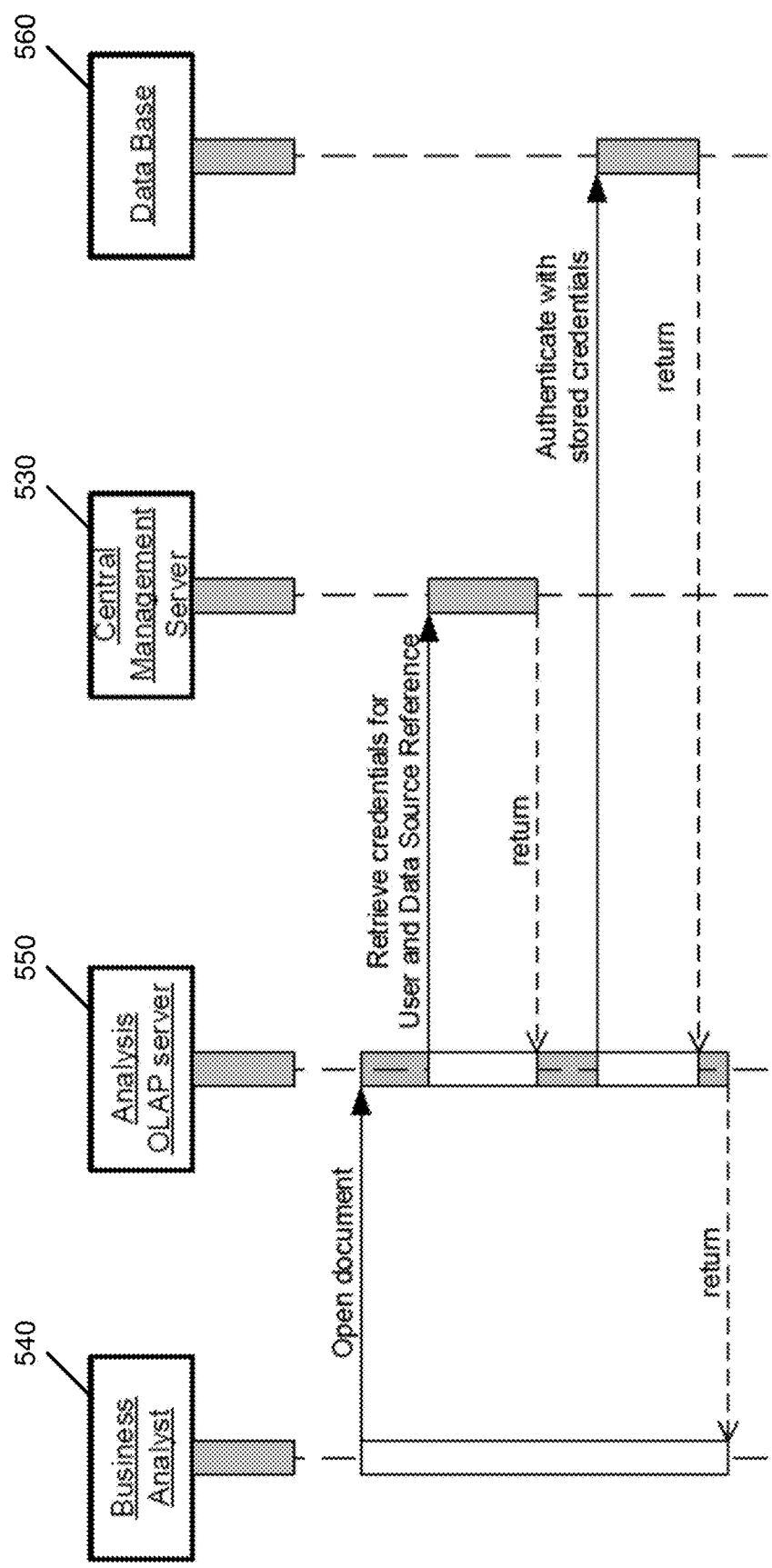
FIG. 8 is a sequence diagram for authenticating a user using mapped credentials.

FIG. 8 is a sequence diagram for authenticating a user using mapped credentials. For example, business analyst 540 or another user can open a document, such as a report with linked data from database 560, from an analysis OLAP server 550. The analysis OLAP server 550 can retrieve credentials from the central management server 530 for the business analyst 540 and the data source reference associated with the document via a connection. Using the retrieved credentials and the data source reference, the business analyst 540 is authenticated for accessing the linked data from the database 560. When consuming a relational or OLAP connection that uses credential mapping, once the appropriate credentials have been retrieved, the business analyst 540 can refresh document content (e.g., documents and data sources that were created using these credentials), such as the linked data from the database 560.

Example 13—Method of Credential Mapping

Figure 9:
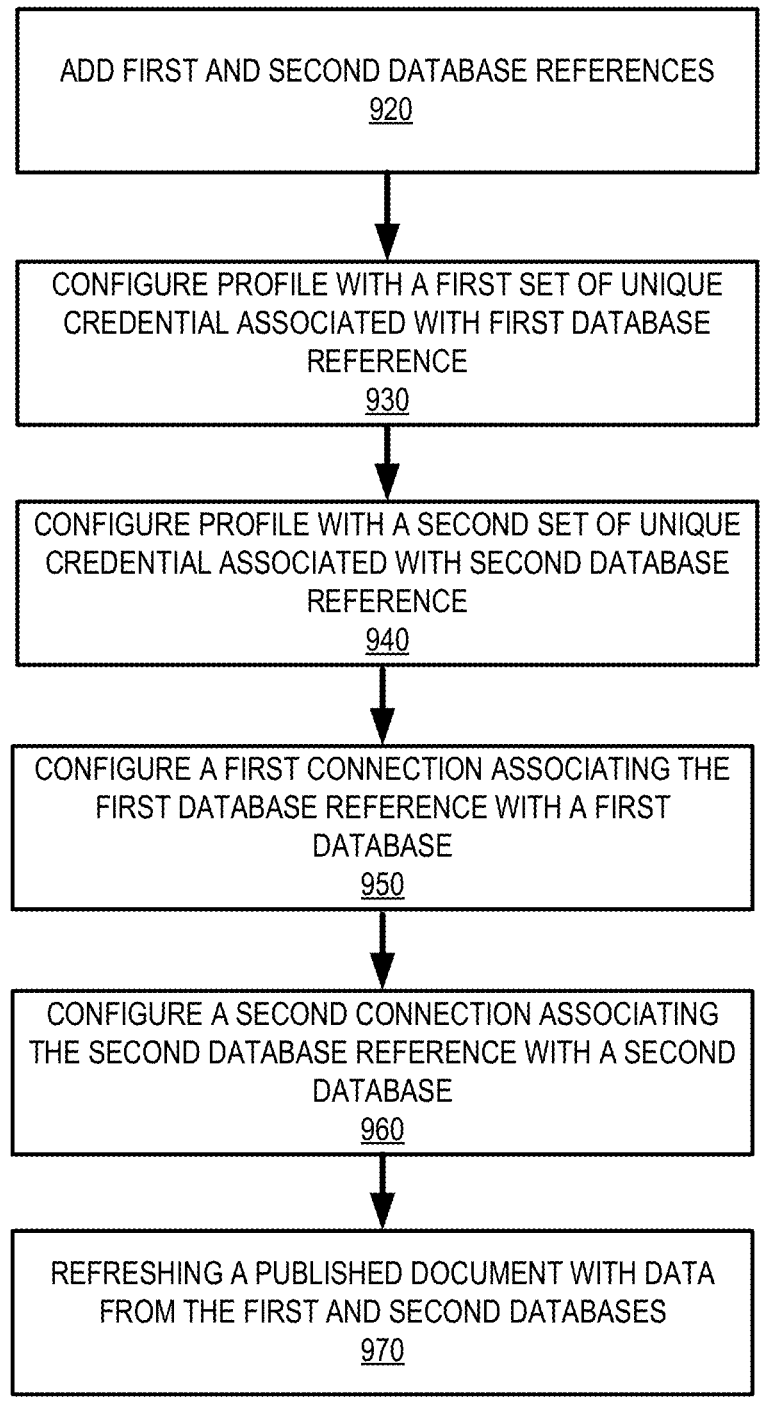
FIG. 9 is a flowchart of an example method of credential mapping in an analytics platform.

FIG. 9 is a flowchart of an example method of credential mapping in an analytics platform. The method 900 can be implemented, for example, by the systems of FIGS. 1, 11, 12, and other systems.

At 920, a first credential mapping key and a second credential mapping key are added to the analytics platform. At 930, a user account is configured with a first set of unique user credentials associated with the first credential mapping key. At 940, the user account is configured with a second set of unique user credentials associated with the second credential mapping key.

At 950, a first connection is configured associating the first credential mapping key with a first data file. For example, configuring the first connection can include selecting a first data file type for the first data file. At 960, a second connection is configured associating the second credential mapping key with a second data file. For example, configuring the second connection comprises selecting a second data file type for the second data file.

At 970, based on an input associated with the user account, a published document is refreshed. For example, the published document includes data from the first and second data files, and refreshing the document updates the data from the first and second data files based on the first and second connections. The first and second data files can be different database types.

In some embodiments, updating the data from the first data file includes authenticating the user account with the first set of unique user credentials from the user account based on the first connection and updating the data from the second data file includes authenticating the user account with the second set of unique user credentials from the user account based on the second connection. For example, authenticating the user account can include retrieving the first set of credentials associated with the first credential mapping key based on the first connection and retrieving the second set of credentials associated with the second credential mapping key based on the second connection. In this example, the user account is authenticated with the retrieved first and second sets of credentials. The user account can also be automatically authenticated based on refreshing the published document, without the user being aware of the authentication.

Example 14—Method of Credential Mapping

Figure 10:
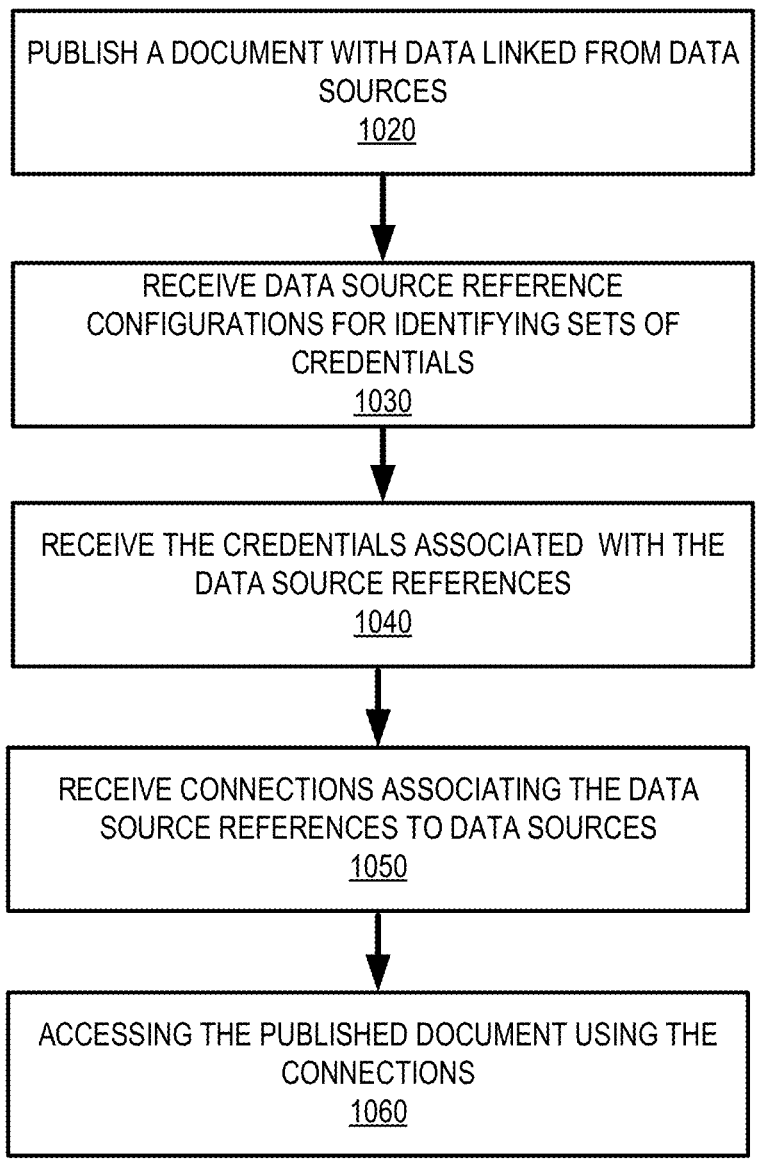
FIG. 10 is a flowchart of another example method of credential mapping in an analytics platform.

FIG. 10 is a flowchart of another example method of credential mapping in an analytics platform. The method 1000 can be implemented, for example, by the systems of FIGS. 1, 11, 12, and other systems.

At 1020, a document is published in an analytics or business intelligence (BI) platform. For example, the document can include data from a first data file and a second data file, such as by linking the data to the document from the first and second data files. In an example, the published document is a report with analytics based at least in part on the linked/fetched data from the first and second data files.

At 1030, first and second credential mapping key configurations are received by the BI platform. For example, the first credential mapping key configuration identifies a first set of credentials in the BI platform and the second credential mapping key configuration identifies a second set of credentials in the BI platform.

At 1040, the first and second sets of credentials are received for a user account of the BI platform. For example, the first set of credentials is associated with the first credential mapping key and the second set of credentials is associated with the second credential mapping key.

At 1050, a first and second connections are received by the BI platform. For example, a first connection is received associating the first credential mapping key with the first data file and a second connection is received associating the second credential mapping key with the second data file.

At 1060, the published document accessed via the user account. For example, accessing the published document can include fetching data from the first and second data files based on the first and second connections. In this example, fetching data from the first and second data files based on the first and second connections can include retrieving the first and second sets of credentials. Based on the first connection, the first set of credentials associated with the first credential mapping key are retrieved by the BI platform. Based on the second connection, the second set of credentials associated with the second credential mapping key are retrieved by the BI platform. After retrieving the credentials, the user account can be authenticated with the retrieved first and second sets of credentials.

Example 15—Example Enhancements

In practice, the systems shown herein can vary in complexity, with additional functionality, more complex components, and the like. For example, there can be additional functionality. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

Any of the systems described herein can be implemented in conjunction with any of the hardware components described herein, such as the computing systems described below. In any of the examples herein, the credentials and the like can be stored in one or more computer-readable storage media or computer-readable storage devices. The technologies described herein can be generic to the specifics of operating systems or hardware and can be applied in any variety of environments to take advantage of the described features.

Any of the methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies.

Example 16—Example Computing Systems

Figure 11:
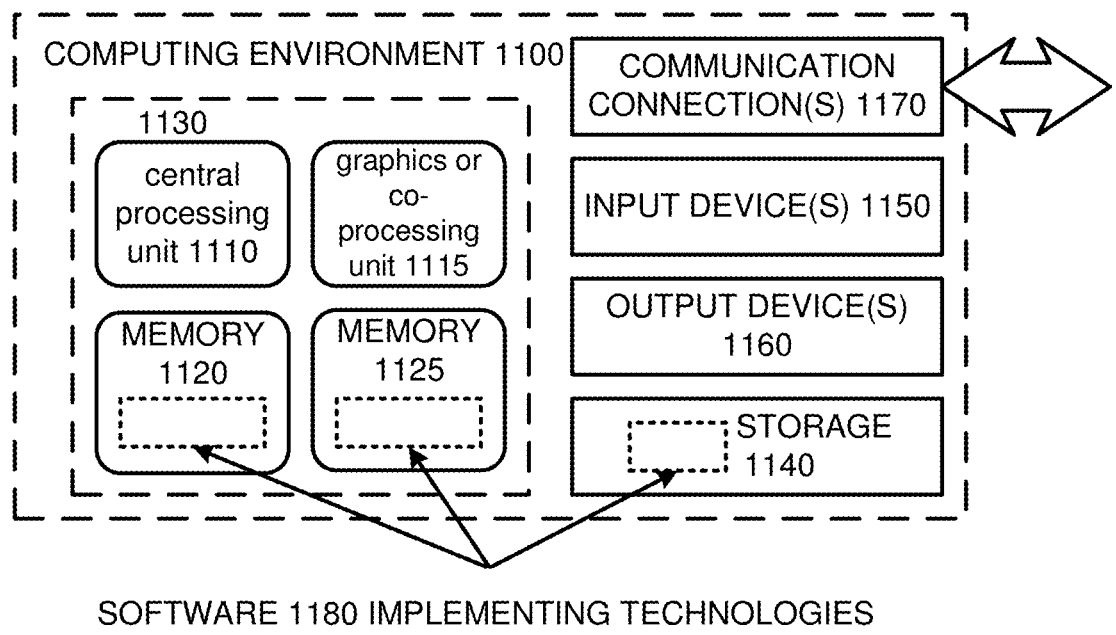
FIG. 11 is a block diagram of an example computing system in which described embodiments can be implemented.

FIG. 11 depicts an example of a suitable computing system 1100 in which the described innovations can be implemented. The computing system 1100 is not intended to suggest any limitation as to scope of use or functionality of the present disclosure, as the innovations can be implemented in diverse computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 can be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 stores software 1180 implementing one or more innovations described herein, in the form of computer-executable instructions suitable for execution by the processing unit(s) 1110, 1115.

A computing system 1100 can have additional features. For example, the computing system 1100 includes storage 1140, one or more input devices 1150, one or more output devices 1160, and one or more communication connections 1170, including input devices, output devices, and communication connections for interacting with a user. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 can be removable or non-removable, and includes magnetic disks, magnetic tapes or cassettes, CD-ROMs, DVDs, or any other medium which can be used to store information in a non-transitory way and which can be accessed within the computing system 1100.

The storage 1140 stores instructions for the software 1180 implementing one or more innovations described herein.

The input device(s) 1150 can be an input device such as a keyboard, mouse, pen, or trackball, a voice input device, a scanning device, touch device (e.g., touchpad, display, or the like) or another device that provides input to the computing system 1100. The output device(s) 1160 can be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 17—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 18—Example Cloud Computing Environment

Figure 12:
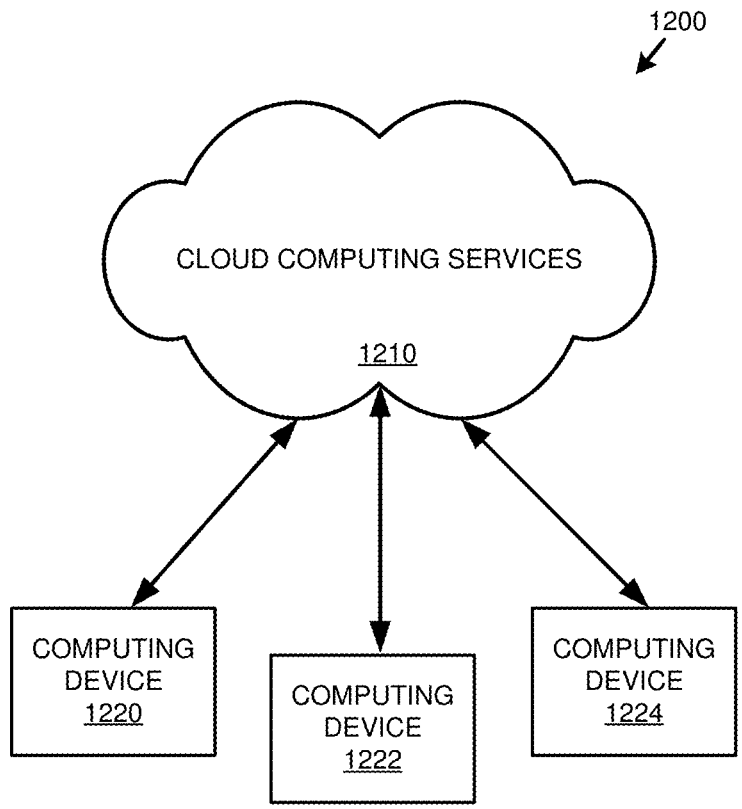
FIG. 12 is a block diagram of an example cloud computing environment that can be used in conjunction with the technologies described herein.

FIG. 12 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operations (e.g., data processing, data storage, and the like).

In practice, cloud-based, on-premises-based, or hybrid scenarios can be supported.

Example 19—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 20—Example Embodiments

Any of the following embodiments can be implemented.

Clause 1. A computer-implemented method comprising:
configuring a first credential mapping key object for a first data file;
configuring a second credential mapping key object for a second data file;
configuring a first user object associated with a user account, the first user object comprising a first set of unique user credentials associated with the first credential mapping key object;
configuring a second user object associated with the user account, the second user object comprising a second set of unique user credentials associated with the second credential mapping key object;
configuring a first connection object associating the first credential mapping key object with the first data file;
configuring a second connection object associating the second credential mapping key object with the second data file; and
refreshing, in the user account, a published document, the published document comprising data from the first and second data files, the refreshing comprising updating the data from the first and second data files,
wherein updating the data from the first data file comprises accessing the first data file with the first set of unique user credentials from the first user object based on the first connection, and
wherein updating the data from the second data file comprises accessing the second data file with the second set of unique user credentials from the second user object based on the second connection.

Clause 2. The method of Clause 1, wherein:
the first and second data files comprise different database file types.

Clause 3. The method of any one of Clauses 1 or 2, wherein:
the first and second data files comprise relational and graphical databases.

Clause 4. The method of any one of Clauses 1-3, wherein:
the first set of unique user credentials is associated with the first credential mapping key object by a first unique identifier; and
the second set of unique user credentials is associated with the second credential mapping key object by a second unique identifier.

Clause 5. The method of any one of Clauses 1-4, wherein:
the first set of unique user credentials comprises a first username and a first password; and
the second set of unique user credentials comprises a second username and a second password.

Clause 6. The method of any one of Clauses 1-5, wherein:
the first set of unique user credentials is for a first database type; and
the second set of unique user credentials is for a second database type.

Clause 7. The method of any one of Clauses 1-6, wherein:
configuring the first and second connection objects comprises enabling credential mapping key authentication for the first and second connection objects.

Clause 8. The method of any one of Clauses 1-7, wherein:
configuring the first connection object comprises selecting a first data file type for the first connection object; and
configuring the second connection object comprises selecting a second data file type for the second connection object.

Clause 9. The method of any one of Clauses 1-8, further comprising:
configuring a third credential mapping key object for a third data file;
configuring a user group object associated with a plurality of profiles, the user group object comprising a third set of unique user credentials associated with the third credential mapping key object; and
configuring a third connection object associating the third credential mapping key object with the third data file.

Clause 10. The method of any one of Clauses 1-9, wherein:
the published document further comprises data from the third data files, the refreshing further comprising updating the data from the third data file, and
wherein updating the data from the first data file comprises accessing the third data file with the third set of unique user credentials from the user group object based on the third connection.

Clause 11. A computing system comprising:
one or more processors;
memory configured to cause the one or more processors to perform operations comprising:
adding a first credential mapping key and a second credential mapping key;
configuring a profile with a first set of unique user credentials associated with the first credential mapping key;
configuring the profile with a second set of unique user credentials associated with the second credential mapping key;
configuring a first connection associating the first credential mapping key with a first data file;
configuring a second connection associating the second credential mapping key with a second data file; and refreshing, based on an input associated with the profile, a published document, the published document comprising data from the first and second data files, the refreshing comprising updating the data from the first and second data files based on the first and second connections.

Clause 12. The computing system of Clause 11 wherein:
updating the data from the first data file comprises authenticating the profile with the first set of unique user credentials from the profile based on the first connection, and
updating the data from the second data file comprises authenticating the profile with the second set of unique user credentials from the profile based on the second connection.

Clause 13. The computing system of any one of Clauses 11 or 12 wherein:
authenticating the profile comprises:
retrieving, based on the first connection, the first set of credentials associated with the first credential mapping key; and
retrieving, based on the second connection, the second set of credentials associated with the second credential mapping key,
wherein the profile is authenticated with the retrieved first and second sets of credentials.

Clause 14. The computing system of any one of Clauses 11-13 wherein:
the profile is automatically authenticated based on refreshing the published document.

Clause 15. The computing system of any one of Clauses 11-14 wherein:
the first and second data files comprise different database types.

Clause 16. The computing system of any one of Clauses 11-15 wherein:
configuring the first connection comprises selecting a first data file type for the first data file; and
configuring the second connection comprises selecting a second data file type for the second data file.

Clause 17. The computing system of any one of Clauses 11-16 wherein:
configuring the first and second connections comprises selecting a data file type for the first and second data files.

Clause 18. One or more non-transitory computer-readable media comprising computer-executable instructions that, when executed, cause a computing system to perform a method comprising:
publishing, in an analytics platform, a document comprising data from a first data file and a second data file, wherein the data is linked to the document from the first and second data files;
receiving, by the analytics platform, a first credential mapping key configuration for identifying a first set of credentials and a second credential mapping key configuration for identifying a second set of credentials;
receiving, for a profile of the analytics platform, the first set of credentials associated with the first credential mapping key and the second set of credentials associated with the second credential mapping key;
receiving, by the analytics platform, a first connection associating the first credential mapping key with the first data file and a second connection associating the second credential mapping key with the second data file; and
accessing, via the profile, the published document, the accessing comprising fetching data from the first and second data files based on the first and second connections.

Clause 19. The method of Clause 18, wherein fetching data from the first and second data files based on the first and second connections comprises:

retrieving, based on the first connection, the first set of credentials associated with the first credential mapping key;
retrieving, based on the second connection, the second set of credentials associated with the second credential mapping key; and
authenticating the profile with the retrieved first and second sets of credentials.

Clause 20. The method of any one of Clauses 18 or 19 wherein:
the first and second data files comprise different database file types.

Example 21—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

We claim:
1. A computer-implemented method comprising:
configuring a first credential mapping key object for a first data file;
configuring a second credential mapping key object for a second data file;
in a central management server of an analytics platform, configuring a first user object associated with a user account, the first user object comprising a first set of unique user credentials associated with the first credential mapping key object;
in the central management server, configuring a second user object associated with the user account, the second user object comprising a second set of unique user credentials associated with the second credential mapping key object;
in the central management server, configuring a first connection object associating the first credential mapping key object with the first data file;
in the central management server, configuring a second connection object associating the second credential mapping key object with the second data file; and
refreshing, in the user account, a published document, the published document comprising data from the first and second data files, the refreshing comprising updating the data from the first and second data files,
wherein updating the data from the first data file comprises accessing the first data file with the first set of unique user credentials from the first user object based on the first connection object, and
wherein updating the data from the second data file comprises accessing the second data file with the second set of unique user credentials from the second user object based on the second connection object.

2. The method of claim 1, wherein:
the first and second data files comprise different database file types.

3. The method of claim 1, wherein:
the first and second data files comprise relational and graphical databases.

4. The method of claim 1, wherein:
the first set of unique user credentials is associated with the first credential mapping key object by a first unique identifier; and
the second set of unique user credentials is associated with the second credential mapping key object by a second unique identifier.

5. The method of claim 1, wherein:
the first set of unique user credentials comprises a first username and a first password; and
the second set of unique user credentials comprises a second username and a second password.

6. The method of claim 5, wherein:
the first set of unique user credentials is for a first database type; and
the second set of unique user credentials is for a second database type.

7. The method of claim 1, wherein:
configuring the first and second connection objects comprises enabling credential mapping key authentication for the first and second connection objects.

8. The method of claim 1, wherein:
configuring the first connection object comprises selecting a first data file type for the first connection object; and
configuring the second connection object comprises selecting a second data file type for the second connection object.

9. The method of claim 1, further comprising:
configuring a third credential mapping key object for a third data file;
configuring a user group object associated with a plurality of profiles, the user group object comprising a third set of unique user credentials associated with the third credential mapping key object; and
configuring a third connection object associating the third credential mapping key object with the third data file.

10. The method of claim 9, wherein:
the published document further comprises data from the third data file, the refreshing further comprising updating the data from the third data file, and
wherein updating the data from the first data file comprises accessing the third data file with the third set of unique user credentials from the user group object based on the third connection object.

11. A computing system comprising:
one or more processors;
memory configured to cause the one or more processors to perform operations comprising:
in a central management console, adding a first credential mapping key and a second credential mapping key to an analytics platform;
in the central management console, configuring a profile with a first set of unique user credentials associated with the first credential mapping key;
in the central management console, configuring the profile with a second set of unique user credentials associated with the second credential mapping key;
in the central management console, configuring a first connection associating the first credential mapping key with a first data file;
in the central management console, configuring a second connection associating the second credential mapping key with a second data file; and
refreshing, based on an input associated with the profile, a published document, the published document comprising data from the first and second data files, the refreshing comprising updating the data from the first and second data files based on the first and second connections.

12. The computing system of claim 11 wherein:
updating the data from the first data file comprises authenticating the profile with the first set of unique user credentials from the profile based on the first connection, and
updating the data from the second data file comprises authenticating the profile with the second set of unique user credentials from the profile based on the second connection.

13. The computing system of claim 11 wherein:
authenticating the profile comprises:
retrieving, based on the first connection, the first set of credentials associated with the first credential mapping key; and
retrieving, based on the second connection, the second set of credentials associated with the second credential mapping key,
wherein the profile is authenticated with the retrieved first and second sets of credentials.

14. The computing system of claim 11 wherein:
the profile is automatically authenticated based on refreshing the published document.

15. The computing system of claim 11 wherein:
the first and second data files comprise different database types.

16. The computing system of claim 11 wherein:
configuring the first connection comprises selecting a first data file type for the first data file; and
configuring the second connection comprises selecting a second data file type for the second data file.

17. The computing system of claim 11 wherein:
configuring the first and second connections comprises selecting a data file type for the first and second data files.

18. One or more non-transitory computer-readable media comprising computer-executable instructions that, when executed, cause a computing system to perform a method comprising:
publishing, in an analytics platform, a document comprising data from a first data file and a second data file, wherein the data is linked to the document from the first and second data files;
receiving, by the analytics platform, a first credential mapping key configuration of a first credential mapping key for identifying a first set of credentials and a second credential mapping key configuration of a second credential mapping key for identifying a second set of credentials;
receiving, for a profile of the analytics platform, from a central management server, the first set of credentials associated with the first credential mapping key and the second set of credentials associated with the second credential mapping key;
receiving, by the analytics platform, a first connection associating the first credential mapping key with the first data file and a second connection associating the second credential mapping key with the second data file; and
accessing, via the profile, the published document, the accessing comprising fetching data from the first and second data files via the first set of credentials and the second set of credentials from the central management server based on the first and second connections.

19. The method of claim 18, wherein fetching data from the first and second data files based on the first and second connections comprises:
- retrieving, based on the first connection, the first set of credentials associated with the first credential mapping key;
- retrieving, based on the second connection, the second set of credentials associated with the second credential mapping key; and
- authenticating the profile with the retrieved first and second sets of credentials.

20. The method of claim 18 wherein:
- the first and second data files comprise different database file types.

* * * * *